United States Patent
Kon

(10) Patent No.: US 11,493,707 B2
(45) Date of Patent: Nov. 8, 2022

(54) OPTICAL RECEPTACLE AND OPTICAL MODULE

(71) Applicant: Enplas Corporation, Saitama (JP)

(72) Inventor: Ayano Kon, Saitama (JP)

(73) Assignee: ENPLAS CORPORATION, Saitama (JP)

(*) Notice: Subject to any disclaimer, the term of this patent is extended or adjusted under 35 U.S.C. 154(b) by 0 days.

(21) Appl. No.: 17/218,229

(22) Filed: Mar. 31, 2021

(65) Prior Publication Data
US 2022/0317388 A1 Oct. 6, 2022

(51) Int. Cl.
*H04B 10/00* (2013.01)
*G02B 6/42* (2006.01)

(52) U.S. Cl.
CPC .......... *G02B 6/425* (2013.01); *G02B 6/4206* (2013.01); *G02B 6/4214* (2013.01); *G02B 6/4246* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,198,864 B1* | 3/2001 | Lemoff | ............... | G02B 6/2938 385/47 |
| 6,201,908 B1* | 3/2001 | Grann | ................. | G02B 6/2938 385/47 |
| 6,636,540 B2* | 10/2003 | Uebbing | ............. | G02B 6/4286 372/50.1 |
| 6,888,988 B2* | 5/2005 | Vancoille | ............. | G02B 6/4227 385/47 |
| 7,295,727 B1* | 11/2007 | Thorson | ............... | G02B 6/3582 385/18 |
| 7,349,602 B2* | 3/2008 | Panotopoulos | ...... | G02B 6/2938 385/47 |
| 8,165,432 B2* | 4/2012 | Ohta | ..................... | G02B 6/4214 385/88 |
| 8,303,195 B2* | 11/2012 | Adachi | ............. | H01L 31/02325 385/74 |
| 8,335,411 B2* | 12/2012 | Kuznia | .................. | G01N 21/55 385/47 |
| 8,909,058 B2* | 12/2014 | Sheu | ...................... | H04B 10/40 398/139 |

(Continued)

FOREIGN PATENT DOCUMENTS

JP 2012163903 A 8/2012

*Primary Examiner* — Agustin Bello
(74) *Attorney, Agent, or Firm* — Brundidge & Stanger, P.C.

(57) ABSTRACT

An optical receptacle includes first to third optical surfaces. The attenuation part includes a plurality of reflecting surfaces that reflects a part of the light entered from the first optical surface and a plurality of transmission surfaces that transmits another part of the light entered from the first optical surface. The reflecting surfaces and the transmission surfaces are alternately disposed in a first direction along an intersection line of the third optical surface and a plane including first and second optical axes, the first optical axis being an optical axis of light transmitted through the attenuation part, the second optical axis being an optical axis of light reflected by the attenuation part. In the third optical surface, the attenuation part is shorter than an irradiation spot at the third optical surface of the light entered from the first optical surface, in at least one direction.

8 Claims, 10 Drawing Sheets

(56) References Cited

U.S. PATENT DOCUMENTS

| | | | |
|---|---|---|---|
| 9,052,478 B2* | 6/2015 | Charbonneau-Lefort | G02B 6/32 |
| 9,063,281 B2* | 6/2015 | Lin | G02B 6/4286 |
| 9,140,866 B2* | 9/2015 | Lee | G02B 6/43 |
| 9,195,017 B2* | 11/2015 | Liao | H04B 10/40 |
| 9,229,184 B2* | 1/2016 | Lin | G02B 6/4292 |
| 9,244,234 B2* | 1/2016 | Tanazawa | G02B 27/143 |
| 9,354,409 B2* | 5/2016 | Tanazawa | G02B 6/4286 |
| 9,429,725 B2* | 8/2016 | Shao | G02B 6/4214 |
| 9,488,792 B2* | 11/2016 | Morioka | G02B 6/4259 |
| 9,541,720 B1* | 1/2017 | Wu | G02B 6/32 |
| 9,606,305 B1* | 3/2017 | Yu | G02B 6/32 |
| 9,690,060 B2* | 6/2017 | Dai | G02B 6/428 |
| 9,703,041 B2* | 7/2017 | Smith | G02B 6/34 |
| 9,733,438 B2* | 8/2017 | Yu | G02B 6/4206 |
| 9,869,818 B2* | 1/2018 | Tang | G02B 6/4295 |
| 9,891,385 B2* | 2/2018 | Tang | G02B 6/3825 |
| 9,971,106 B2* | 5/2018 | Morioka | H01S 5/02251 |
| 9,995,941 B2* | 6/2018 | Hallstein | G02B 6/4215 |
| 10,156,687 B2* | 12/2018 | Morioka | G02B 27/10 |
| 10,365,444 B2* | 7/2019 | Morioka | H01S 5/02253 |
| 10,416,397 B2* | 9/2019 | Morioka | G02B 6/42 |
| 10,481,353 B2* | 11/2019 | Morioka | G02B 6/425 |
| 10,591,686 B2* | 3/2020 | Kon | G02B 6/4246 |
| 10,756,839 B1* | 8/2020 | Cheung | H04B 10/40 |
| 10,976,510 B2* | 4/2021 | Kon | G02B 6/4292 |
| 11,067,761 B2* | 7/2021 | Kon | H01S 5/02325 |
| 2003/0063844 A1* | 4/2003 | Caracci | G02B 6/32 385/24 |
| 2005/0084217 A1* | 4/2005 | Yoshimura | G02B 6/4214 385/88 |
| 2005/0089268 A1* | 4/2005 | Chen | G02B 6/2938 385/47 |
| 2008/0226228 A1* | 9/2008 | Tamura | G02B 6/4214 385/33 |
| 2010/0135618 A1* | 6/2010 | Howard | G02B 6/36 385/136 |
| 2011/0064358 A1* | 3/2011 | Nishimura | G02B 6/4214 385/47 |
| 2011/0097037 A1* | 4/2011 | Kuznia | G02B 6/4246 264/1.24 |
| 2011/0317959 A1* | 12/2011 | Ohta | G02B 6/4214 385/38 |
| 2012/0063721 A1* | 3/2012 | Chen | G02B 6/4286 385/33 |
| 2012/0263416 A1* | 10/2012 | Morioka | G02B 6/4286 385/33 |
| 2014/0029953 A1* | 1/2014 | Otte | H04B 10/501 398/139 |
| 2014/0133802 A1* | 5/2014 | Morioka | G02B 6/4286 385/33 |
| 2014/0328558 A1* | 11/2014 | Morioka | G02B 6/4286 385/33 |
| 2014/0339403 A1* | 11/2014 | Morioka | G01J 1/0407 250/227.11 |
| 2015/0010272 A1* | 1/2015 | Tanazawa | G02B 6/4286 385/31 |
| 2015/0030285 A1* | 1/2015 | Tanazawa | G02B 6/4214 385/31 |
| 2016/0004020 A1* | 1/2016 | Shao | G02B 3/04 385/24 |
| 2018/0017743 A1* | 1/2018 | Morioka | G02B 19/0028 |
| 2018/0284368 A1* | 10/2018 | Morioka | G02B 6/4214 |
| 2020/0409000 A1* | 12/2020 | Kon | G02B 6/4292 |

\* cited by examiner

OPTICAL RECEPTACLE AND OPTICAL MODULE

TECHNICAL FIELD

The present invention relates to an optical receptacle and an optical module.

BACKGROUND ART

In the related art, in optical communications using an optical transmission member such as an optical fiber and a light waveguide, an optical module including a light-emitting element such as a surface-emitting laser (for example, a vertical-cavity surface-emitting laser (VCSEL) is used. An optical module includes one or more photoelectric conversion elements (light-emitting elements or light-receiving elements), an optical receptacle for transmission, an optical receptacle for reception or an optical receptacle for transmission and reception.

In some situation, in an optical module for transmission, a part of the light emitted from the light-emitting element is utilized as detection light to detect whether light is appropriately emitted from a light-emitting element (see, for example, PTL 1). In addition, in some situation, in an optical module for transmission, the quantity of the light emitted from the optical receptacle is attenuated for the sake of safety measures.

The optical receptacle (light coupling member) disclosed in PTL 1 includes a first lens part as an incidence surface, a second lens part as an emission surface, and a reflection part disposed at an end portion of the irradiated spot on the light path between the first lens part and the second lens part. The reflection part includes a reflecting surface that reflects light entered from the first lens part toward the second lens surface, a transmission surface that transmits light entered from the first lens part, and a connection surface that connects the reflecting surface and the transmission surface.

In the optical receptacle disclosed in PTL 1, the light emitted from the light-emitting element is entered from the first lens part. Next, a part of the light entered from the first lens part is reflected at the reflection part toward the second lens part. The light reflected at the reflection part is emitted from the second lens part toward the end portion of the optical transmission member. On the other hand, another part of the light entered from the first lens part is transmitted through the light transmission surface. The light transmitted through the transmission surface reaches a detection element disposed opposite to the light-emitting element. In this manner, in the optical receptacle disclosed in PTL 1, a part of the light emitted from the light-emitting element is used as transmission light travelling toward the optical transmission member, and another part of the light is used as detection light travelling toward the detection element.

CITATION LIST

Patent Literature

PTL 1
Japanese Patent Application Laid-Open No. 2012-163903

SUMMARY OF INVENTION

Technical Problem

As described above, in the optical receptacle disclosed in PTL 1, a part of the light entered from the first lens part is transmitted, and another part of the light is reflected, at an end portion of the irradiation spot. That is, in the optical receptacle disclosed in PTL 1, the light that reaches the optical transmission member is a part of the light emitted from the light-emitting element. In this case, at an end surface of the optical transmission member, it is difficult to control the light attenuation rate while maintaining the outer shape of the irradiation spot of the arriving light, and the irradiation spot of the arriving light may be split in some situation. In particular, if the irradiation spot of the light is split at the end portion of the optical transmission member, the tolerance width is reduced in the direction in which the light is split, and consequently high assemble accuracy is required in the optical module.

In view of this, an object of the present invention is to provide an optical receptacle that emits, toward an end portion of the optical transmission member, only a part of light emitted from the light-emitting element, and can increase the ease of control of the attenuation rate in the state where the outer shape of the irradiation spot of the light having reached the end surface of the optical transmission member is maintained, while reducing split of the light that reaches the end portion of the optical transmission member. In addition, another object of the present invention is to provide an optical module including the optical receptacle.

Solution to Problem

An optical receptacle according to an embodiment of the present invention is configured to optically couple a light-emitting element and an optical transmission member when the optical receptacle is disposed between the light-emitting element and the optical transmission member, the optical receptacle including: a first optical surface configured to allow incidence of light emitted from the light-emitting element; a second optical surface configured to emit, toward the optical transmission member, light entered from the first optical surface and advanced inside the optical receptacle; and a third optical surface disposed on a light path between the first optical surface and the second optical surface, the third optical surface including an attenuation part configured to transmit a part of light entered from the first optical surface and reflect another part of the light entered from the first optical surface. The attenuation part includes a plurality of reflecting surfaces configured to reflect a part of the light entered from the first optical surface and a plurality of transmission surfaces configured to transmit another part of the light entered from the first optical surface. The plurality of reflecting surfaces and the plurality of transmission surfaces are alternately disposed in a first direction along an intersection line of the third optical surface and a plane including a first optical axis and a second optical axis, the first optical axis being an optical axis of light transmitted through the attenuation part, the second optical axis being an optical axis of light reflected by the attenuation part. In the third optical surface, the attenuation part is shorter than an irradiation spot at the third optical surface of the light entered from the first optical surface, in at least one direction.

An optical module according to an embodiment of the present invention includes a light-emitting element; and the optical receptacle configured to optically couple, to optical transmission member, the light emitted from the light-emitting element.

Advantageous Effects of Invention

According to the present invention, in an optical module for transmission including an optical receptacle that emits, toward the end portion of the optical transmission member, a part of light emitted from the light-emitting element, it is possible to increase the ease of control of the attenuation rate in the state where the outer shape of the irradiation spot of the light having reached the end surface of the optical transmission member is maintained, while reducing split of the light that reaches the end portion of the optical transmission member.

DESCRIPTION OF EMBODIMENTS

An optical receptacle and an optical module according to an embodiment of the present invention are described below with reference to the accompanying drawings.

Embodiment 1

Configuration of Optical Module

Figure 1:
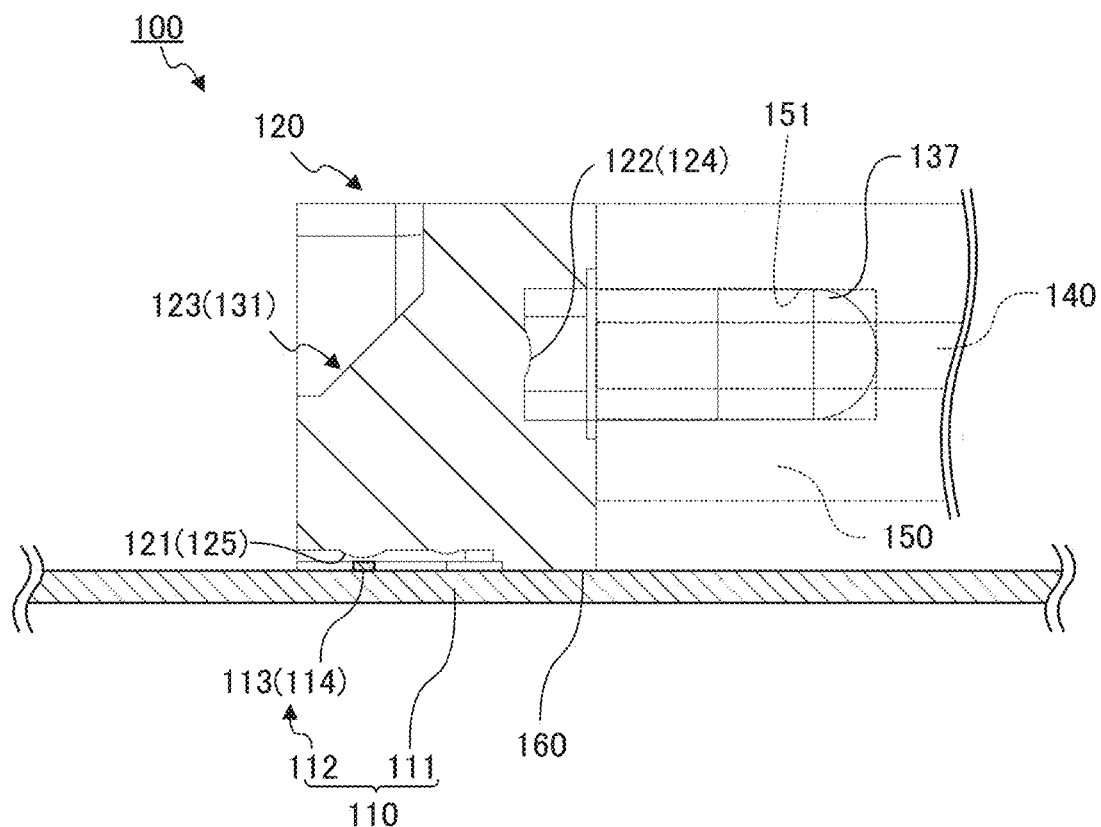
FIG. 1 is a sectional view of an optical module according to Embodiment 1 of the present invention.

FIG. 1 is a sectional view of optical module 100 according to Embodiment 1 of the present invention. Note that in the following description, the arrangement direction of first optical surface 121 is "X direction" (horizontal direction), the direction that is perpendicular to the X direction and extends along installation surface 160 of optical receptacle 120 is "Y direction" (front-rear direction), the direction orthogonal to the X direction and the Y direction is "Z direction" (height direction), and the inclination direction of third optical surface 123 is "Z' direction".

As illustrated in FIG. 1, optical module 100 includes photoelectric conversion apparatus 110 and optical receptacle 120. Optical module 100 is used in the state where optical transmission member 140 is connected to optical receptacle 120. Optical module 100 according to the present embodiment is an optical module for transmission and reception, and is configured to attenuate the quantity of light emitted from light-emitting element 113.

Photoelectric conversion apparatus 110 includes substrate 111 and photoelectric conversion element 112. Photoelectric conversion element 112 and optical receptacle 120 are disposed in substrate 111. A substrate protrusion (omitted in the drawing) corresponding to a substrate recess (omitted in the drawing) of optical receptacle 120 may be formed in substrate 111. By fitting the substrate recess to the substrate protrusion, optical receptacle 120 can be disposed at a predetermined position with respect to photoelectric conversion element 112 on substrate 111. In the present embodiment, the surface of substrate 111 is disposed in parallel with installation surface 160 of optical receptacle 120. The material of substrate 111 is not limited. Examples of substrate 111 include a glass composite substrate and a glass epoxy substrate.

Photoelectric conversion element 112 is light-emitting element 113, light-receiving element 114 or detection device 115, and is disposed on substrate 111. In the case where optical module 100 is an optical module for transmission, photoelectric conversion element 112 is light-emitting element 113. In addition, in the case where optical module 100 is an optical module for transmission and configured to confirm whether light-emitting element 113 is appropriately emitting light, photoelectric conversion element 112 is light-emitting element 113 and detection device 115. In addition, in the case where optical module 100 is an optical module for reception, photoelectric conversion element 112 is light-receiving element 114. In the case where optical module 100 is an optical module for transmission and reception and configured to confirm light-emitting element 113 is appropriately emitting light, photoelectric conversion element 112 is light-emitting element 113, detection device 115 and light-receiving element 114. Optical module 10 according to the present embodiment is an optical module for transmission and reception that does not confirm whether light-emitting element 113 is appropriately emitting light, and as such photoelectric conversion apparatus 110 includes four light-emitting elements 113 and four light-receiving elements 114 as photoelectric conversion element 112. Light-emitting element 113 is, for example, a vertical-cavity surface-emitting laser (VCSEL). Light-receiving element 114 is, for example, a photodetector. In the present embodiment, the light-emitting surface of light-emitting element 113 and the light reception surface of light-receiving element 114 are disposed in parallel.

Optical receptacle 120 is disposed opposite to photoelectric conversion element 112 on substrate 111. When optical receptacle 120 is disposed between photoelectric conversion element 112 and optical transmission member 140, optical receptacle 120 optically couples photoelectric conversion element 112 (light-emitting element 113 or light-receiving element 114) and the end surface of optical transmission member 140. In an optical module for transmission and reception that does not confirm whether light-emitting element 113 is appropriately emitting light 100 as in the present embodiment, optical receptacle 120 allows incidence of light emitted from light-emitting element 113 serving as photoelectric conversion element 112, and emits a part of the incident light toward the end surface of optical transmission member 140. In addition, optical receptacle 120 allows incidence of light emitted from the end surface of optical transmission member 140, and emits it toward the light reception surface of light-receiving element 114 serving as photoelectric conversion element 112.

The type of optical transmission member 140 is not limited. Examples of the type of optical transmission member 140 include an optical fiber and a light waveguide.

Optical transmission member 140 is connected to optical receptacle 120 through ferrule 150. In ferrule 150, ferrule recess 151 corresponding to ferrule protrusion 137 of optical receptacle 120 described later is formed. By fitting ferrule recess 151 to ferrule protrusion 137, the end surface of optical transmission member 140 can be fixed at a predetermined position with respect to optical receptacle 120. In the present embodiment, optical transmission member 140 is an optical fiber. In addition, the optical fiber may be of a single mode type or a multiple mode type.

Figure 2:
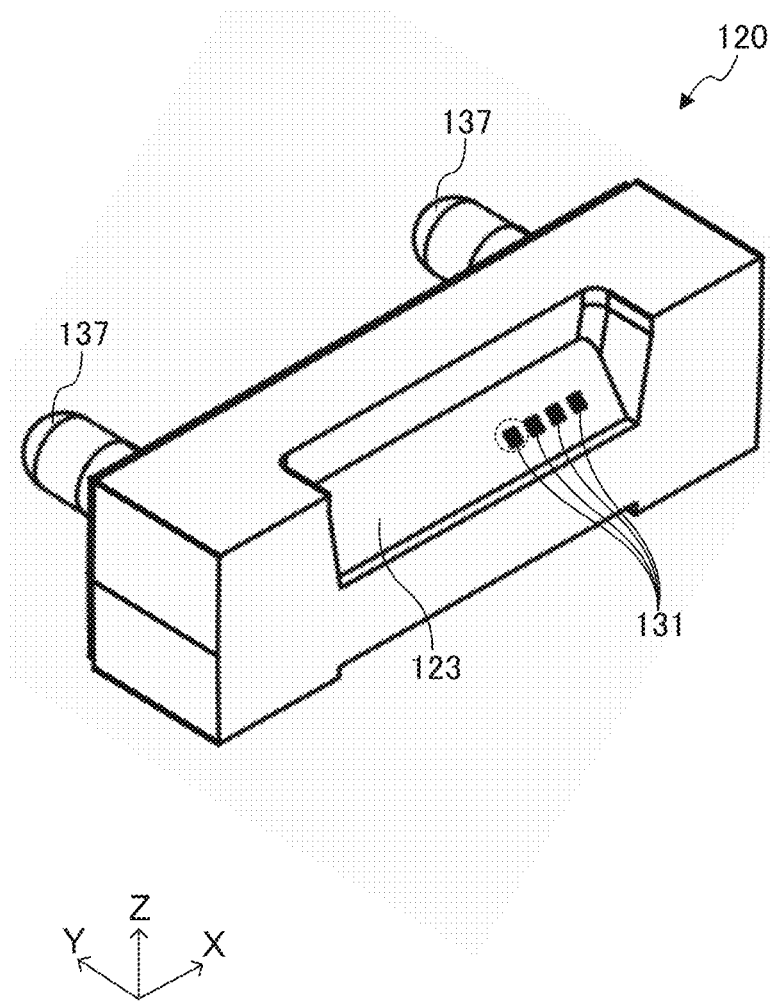
FIG. 2 is a perspective view of an optical receptacle according to Embodiment 1 of the present invention.
Figure 3A:
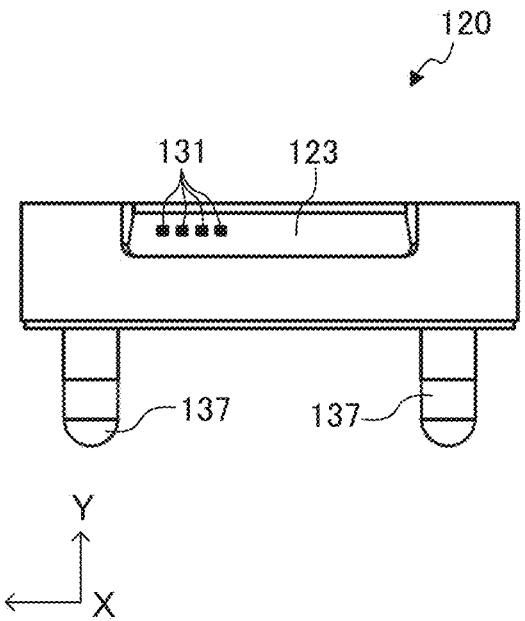
FIGS. 3A to 3D illustrate a configuration of the optical receptacle according to Embodiment 1 of the present invention.
Figure 3C:
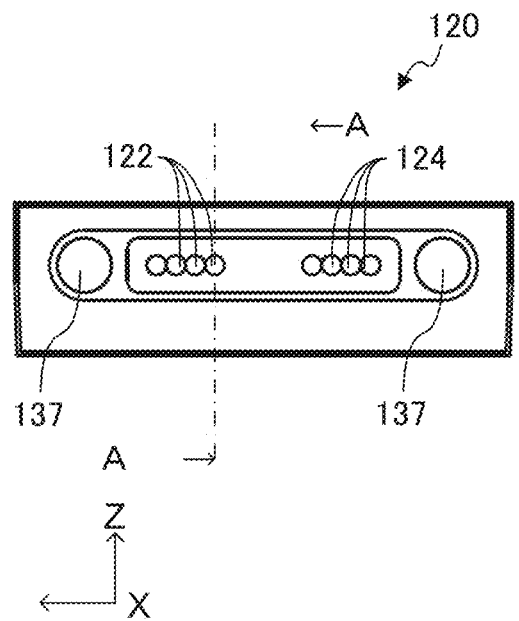
Figure 3B:
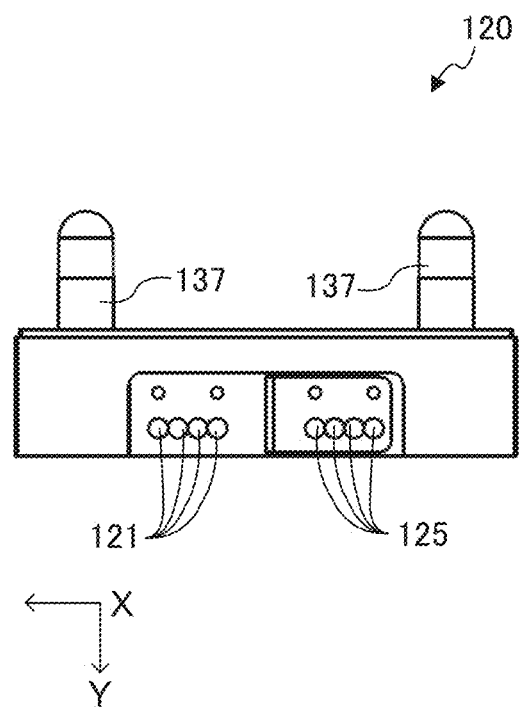
Figure 3D:
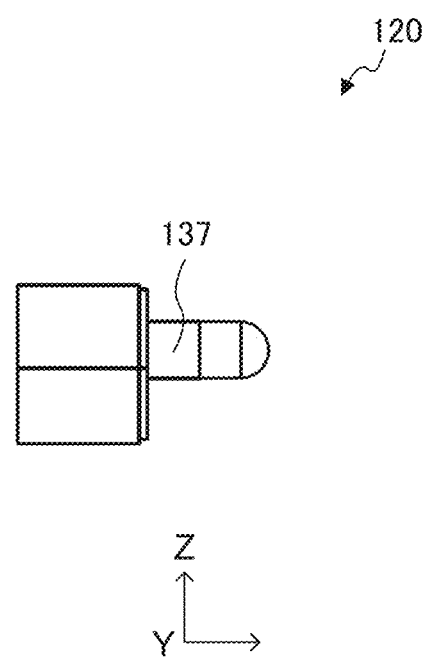
Figure 4A:
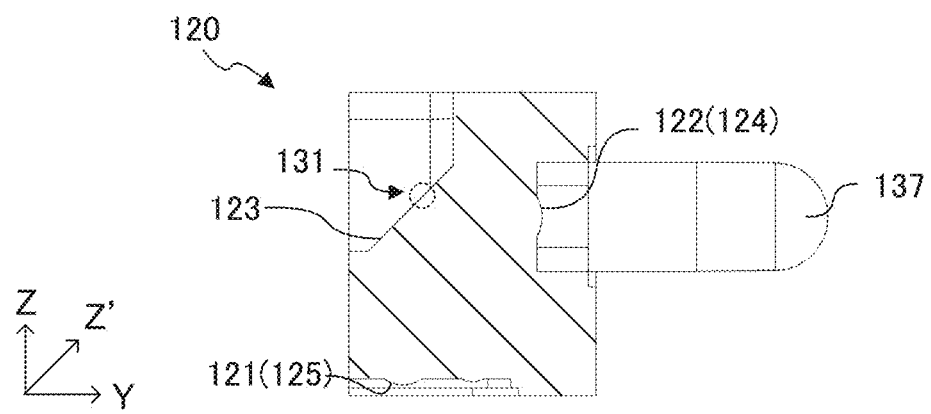
FIGS. 4A to 4C illustrate a configuration of the optical receptacle according to Embodiment 1 of the present invention.
Figure 4B:
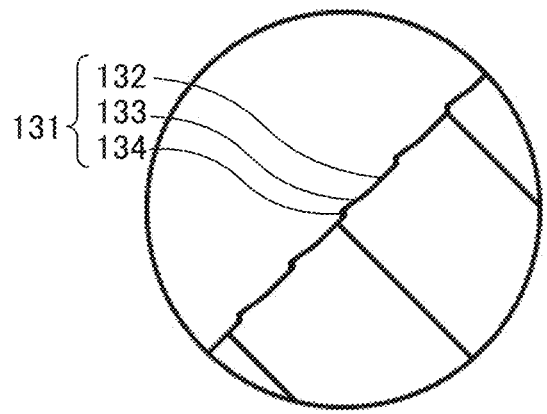
Figure 4C:
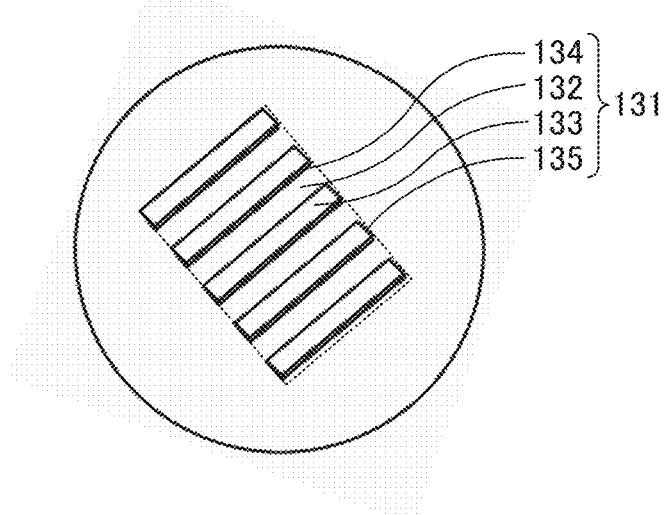

Configuration of Optical Receptacle FIG. 2 is a perspective view of optical receptacle 120. FIG. 3A is a plan view of optical receptacle 120, FIG. 3B is a bottom view, FIG. 3C is a front view, and FIG. 3D is a left side view. FIG. 4A is a sectional view taken along line A-A of FIG. 3C, FIG. 4B is an enlarged view of the region surrounded by the broken line illustrated in FIG. 4A, and FIG. 4C is an enlarged view of the region surrounded by the broken line illustrated in FIG. 2.

As illustrated in FIGS. 2 to 4C, optical receptacle 120 is a member with a substantially cuboid shape. Optical receptacle 120 includes first optical surface 121, second optical surface 122, third optical surface 123, fourth optical surface 124, and fifth optical surface 125. First optical surface 121, second optical surface 122 and third optical surface 123 (a region including attenuation part 131 described later) are used for transmission. Fourth optical surface 124, fifth optical surface 125 and third optical surface 123 (a region that does not include attenuation part 131) are used for reception.

Optical receptacle 120 is formed of a material that is optically transparent to light of the wavelength used for optical communications. Examples of the material of optical receptacle 120 include transparent resins such as polyetherimide (PEI) such as ULTEM (registered trademark), and cyclic olefin resin. In addition, optical receptacle 120 can be integrally molded as a single member by injection molding in manufacture, for example.

First optical surface 121 is an incidence surface configured to enter the light emitted from light-emitting element 113 into optical receptacle 120. First optical surface 121 is disposed in the surface (bottom surface) of optical receptacle 120 that faces substrate 111 so as to be able to face each light-emitting element 113. The number of first optical surfaces 121 is equal to the number of light-emitting elements 113. That is, in the present embodiment, four first optical surfaces 121 are provided and they are disposed on the same straight line.

The shape of first optical surface 121 is not limited. In the present embodiment, the shape of first optical surface 121 is a shape of a convex lens surface protruding toward light-emitting element 113. In addition, first optical surface 121 has a circular shape in plan view. The central axis of first optical surface 121 may be or may not be perpendicular to the light-emitting surface of light-emitting element 113. In the present embodiment, the central axis of first optical surface 121 is perpendicular to the light-emitting surface of light-emitting element 113. In addition, the central axis of first optical surface 121 may be or may not be aligned with the optical axis of the light emitted from light-emitting element 113 (the central axis of the light-emitting surface of light-emitting element 113). In the present embodiment, the central axis of first optical surface 121 is aligned with the optical axis of the light emitted from light-emitting element 113 (the central axis of the light-emitting surface of light-emitting element 113).

Second optical surface 122 is an emission surface for emitting, toward the end surface of optical transmission member 140, light entered from first optical surface 121 and advanced inside optical receptacle 120. Second optical surface 122 is disposed in the front surface of optical receptacle 120 such that it can face the end surface of optical transmission member 140 for transmission. The number of second optical surfaces 122 is the same as the number of first optical surfaces 121. That is, in the present embodiment, four second optical surfaces 122 are provided. Second optical surfaces 122 are disposed in parallel with the installation direction of first optical surfaces 121. In addition, second optical surfaces 122 are disposed on the same straight line.

The shape of second optical surface 122 is not limited. In the present embodiment, the shape of second optical surface 122 is a shape of a convex lens surface protruding toward the end surface of optical transmission member 140. In addition, second optical surface 122 has a circular shape in plan view. The central axis of second optical surface 122 may be or may not be perpendicular to the end surface of optical transmission member 140. In the present embodiment, the central axis of second optical surface 122 is perpendicular to the end surface of optical transmission member 140. In addition, the central axis of second optical surface 122 may be or may not be aligned with the central axis of the end surface of optical transmission member 140 where emitted light enters. In the present embodiment, the central axis of second optical surface 122 is aligned with the central axis of the end surface of optical transmission member 140 where emitted light enters.

Third optical surface 123 reflects, toward second optical surface 122, the light entered from first optical surface 121, and reflects, toward fifth optical surface 125, the light entered from fourth optical surface 124. Third optical surface 123 is tilted toward optical transmission member 140 (second optical surface 122) in the direction from the bottom surface toward the top surface of optical receptacle 120. In the present embodiment, the inclination angle of third optical surface 123 is 45° with respect to the optical axis of light incident on third optical surface 123. Third optical surface 123 includes attenuation part 131.

Attenuation part 131 transmits a part of the light entered from first optical surface 121, and reflects another part of the light. Attenuation part 131 attenuates the quantity of the light emitted from light-emitting element 113, and sends a predetermined quantity of light to optical transmission member 140. Attenuation part 131 is disposed in a region where the light emitted from light-emitting element 113 and entered from first optical surface 121 arrives. Attenuation part 131 includes a plurality of reflecting surfaces 132 and a plurality of transmission surfaces 133. Attenuation part 131 may further include connection surface 134 and side surface 135. In the present embodiment, attenuation part 131 includes a plurality of reflecting surfaces 132, a plurality of transmission surfaces 133, a plurality of connection surfaces 134, and a plurality of side surfaces 135. In the present embodiment, five reflecting surfaces 132, five transmission surfaces 133, and five connection surfaces 134 are provided.

When the optical axis of the light that transmits through attenuation part 131 is set as a first optical axis and the optical axis of the light that is reflected at attenuation part 131 is set as a second optical axis, transmission surface 133 and connection surface 134 are alternately disposed in a first direction (the Z' direction) along an intersection line of reflecting surface 132 and a plane including the first optical axis and the second optical axis, and are extended along a second direction (the X direction) orthogonal to the intersection line in third optical surface 123. That is, reflecting surface 132, transmission surface 133 and connection surface 134 are repeatedly disposed in the named order in the inclination direction (the Z' direction) of third optical surface 123. Here, "alternately" means that another surface may be disposed between the disposed surfaces. For example, a configuration in which connection surface 134 is disposed between reflecting surface 132 and transmission surface 133 as in the present embodiment is included in a configuration in which "reflecting surface 132 and transmission surface 133 are alternately disposed in the first direction". That is, it suffices that the reflection region including reflecting surface 132 and the transmission region including transmission surface 133 (transmission surface 133 and connection surface 134) are alternately disposed.

Reflecting surface 132 is an optical surface for reflecting, toward second optical surface 122, a part of the light entered from first optical surface 121. Reflecting surface 132 may be a flat surface or a curved surface. In the present embodiment, reflecting surface 132 is a flat surface. Reflecting surface 132 is tilted toward optical transmission member 140 (second optical surface 122) in the direction from the bottom surface toward the top surface of optical receptacle 120. In the present embodiment, the inclination angle of reflecting surface 132 is 45° with respect to the optical axis of the light incident on reflecting surface 132. Reflecting surface 132 and third optical surface 123 are disposed on the same plane.

Transmission surface 133 is an optical surface for transmitting another part of the light entered from first optical surface 121. Transmission surface 133 may be a flat surface or a curved surface. In the present embodiment, transmission surface 133 is a flat surface. In addition, in the present embodiment, transmission surface 133 is tilted toward optical transmission member 140 (second optical surface 122) in the direction from the bottom surface toward the top surface of optical receptacle 120. Note that the inclination angle of transmission surface 133 with respect to installation surface 116 is greater than the inclination angle of reflecting surface 132 with respect to installation surface 116.

The area ratio between reflecting surface 132 and transmission surface 133 is appropriately set in accordance with the quantity of light to be attenuated. To be more specific, the light quantity ratio between the light that is reflected at reflecting surface 132 and the light that transmits through transmission surface 133 is adjusted by adjusting area ratio between the reflecting surface 132 and transmission surface 133 as viewed from first optical surface 121 side. Note that the positional relationship between attenuation part 131 and irradiation spot S at third optical surface 123 of the light entered from first optical surface 121 is described later.

Connection surface 134 is a surface that connects reflecting surface 132 and transmission surface 133. Connection surface 134 may be a flat surface or a curved surface. In the present embodiment, connection surface 134 is a flat surface. Note that in the present embodiment, the inclination angle of connection surface 134 with respect to installation surface 116 is 90°.

Side surface 135 is a surface surrounded by transmission surface 133, connection surface 134, and third optical surface 123. Side surface 135 may be a flat surface or a curved surface. In the present embodiment, side surface 135 is a flat surface. Side surface 135 may be perpendicular or tilted to third optical surface 123. In the present embodiment, side surface 135 is perpendicular to third optical surface 123.

Fourth optical surface 124 is an incidence surface configured to enter, into optical receptacle 120, light emitted from optical transmission member 140. Fourth optical surface 124 is disposed in the front surface of optical receptacle 120 so as to be able to face each optical transmission member 140 for reception. The number of fourth optical surfaces 124 is the same as the number of optical transmission members 140 for reception. Specifically, in the present embodiment, four fourth optical surfaces 124 are provided. Fourth optical surfaces 124 are disposed in the same direction as that of second optical surfaces 122. In addition, in the present embodiment, second optical surface 122 and fourth optical surface 124 are disposed on the same straight line.

The shape of fourth optical surface 124 is not limited. In the present embodiment, the shape of fourth optical surface 124 is a shape of a convex lens surface protruding toward the end surface of optical transmission member 140. In addition, fourth optical surface 124 has a circular shape in plan view. The central axis of fourth optical surface 124 may be or may not be perpendicular to the end surface of optical transmission member 140. In the present embodiment, the central axis of fourth optical surface 124 is perpendicular to the end surface of optical transmission member 140. In addition, the central axis of fourth optical surface 124 may be or may not be aligned with the optical axis of the light emitted from the end surface of optical transmission member 140. In the present embodiment, the central axis of fourth optical surface 124 is aligned with the optical axis of the light emitted from the end surface of optical transmission member 140.

Fifth optical surface 125 is an emission surface for emitting, toward light-receiving element 114, the light entered from fourth optical surface 124 and advanced inside optical receptacle 120. Fifth optical surface 125 is disposed in the surface (bottom surface) of optical receptacle 120 that faces substrate 111 so as to be able to face each light-receiving element 114. The number of fifth optical surfaces 125 is not limited. In the present embodiment, four fifth optical surfaces 125 are provided. Four fifth optical surfaces 125 are disposed in the same direction as that of first optical surfaces 121. In addition, in the present embodiment, first optical surface 121 and fifth optical surface 125 are disposed on the same straight line.

The shape of fifth optical surface 125 is not limited. In the present embodiment, the shape of fifth optical surface 125 is a shape of a convex lens surface protruding toward light-receiving element 114. In addition, fifth optical surface 125 has a circular shape in plan view. The central axis of fifth optical surface 125 may be or may not be perpendicular to the light reception surface of light-receiving element 114. In the present embodiment, the central axis of fifth optical surface 125 is perpendicular to the light reception surface of light-receiving element 114. In addition, the central axis of fifth optical surface 125 may be or may not be aligned with the central axis of the light reception surface of light-receiving element 114. In the present embodiment, the central axis of the central axis of fifth optical surface 125 is aligned with the light reception surface of light-receiving element 114.

A pair of ferrule protrusions 137 is disposed in such a manner as to sandwich a plurality of second optical surfaces 122 and a plurality of fourth optical surfaces 124 described later. As described above, ferrule protrusion 137 is fit to ferrule recess 151 formed in ferrule 150 of optical transmission member 140. Together with ferrule recess 151, ferrule protrusion 137 fixes the end surface of optical transmission member 140 at an appropriate position with respect to second optical surface 122. The shape and size of ferrule protrusion 137 are not limited as long as the above-described effects can be achieved. In the present embodiment, ferrule protrusion 137 is a protrusion with a substantially columnar shape.

Figure 5A:
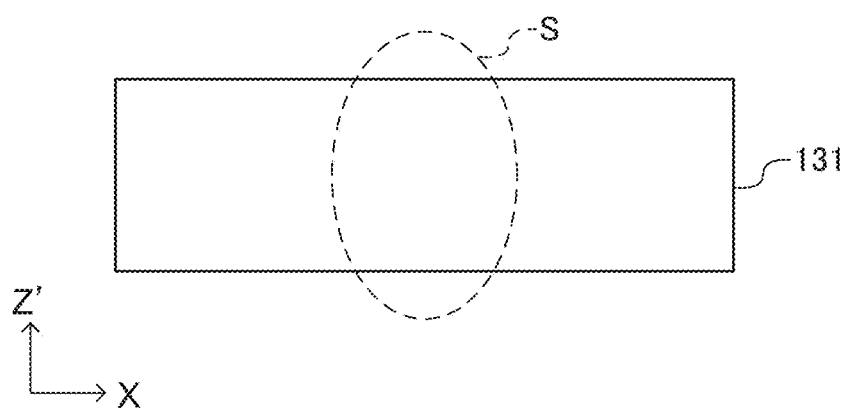
FIGS. 5A to 5C are schematic views illustrating relationships of positions and sizes of an attenuation part and a light irradiation spot.
Figure 5B:
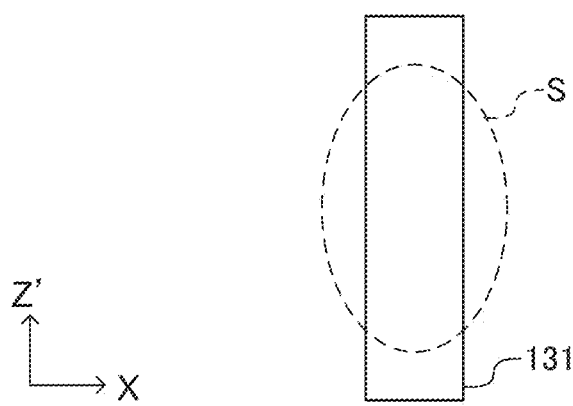
Figure 5C:
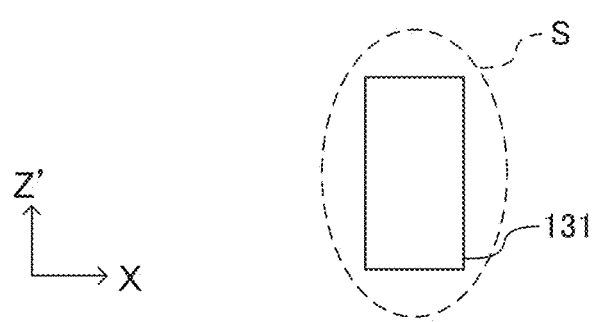

Relationships of the positions and the sizes of attenuation part 131 and irradiation spot S at the time of transmission of light emitted from light-emitting element 113 are described below. FIGS. 5A to 5C are schematic views illustrating relationships of the positions and the sizes of irradiation spot S on third optical surface 123 of the present embodiment of light entered from first optical surface 121 and attenuation part 131. FIGS. 5A to 5C differ from each other in the position and the size of attenuation part 131.

In the present embodiment, attenuation part 131 is shorter than irradiation spot S at third optical surface 123 of the light entered from first optical surface 121, in at least one direction. The positional relationship between attenuation part 131 and irradiation spot S is not limited as long as attenuation part 131 is included in irradiation spot S with a margin in at least one direction.

For example, as illustrated in FIG. 5A, it is preferable that attenuation part 131 is shorter than the irradiation spot in the first direction (the Z' direction). Note that preferably, the length of attenuation part 131 in the first direction is 40% to 95% of the length of irradiation spot S in the first direction. Here, irradiation spot S means a region being irradiated with light with an intensity of 1% or greater of a maximum intensity in third optical surface 123.

In addition, as illustrated in FIG. 5B, preferably, attenuation part 131 is shorter than irradiation spot S in the second direction (the X direction). Note that preferably, the length of attenuation part 131 in the second direction is 40% to 95% of the length of irradiation spot S in the second direction. That is, in this aspect, a region where attenuation part 131 is not formed is provided at the outer edge of irradiation spot S in the second direction.

In addition, as illustrated in FIG. 5C, preferably, attenuation part 131 is shorter than irradiation spot S in both the first direction and in the second direction. For example, preferably, attenuation part 131 is completely included in irradiation spot S with a margin. Note that preferably, the length of attenuation part 131 in the first direction is 40% to 95% of the length of irradiation spot S in the first direction. In addition, preferably, the length of attenuation part 131 in the second direction is 40% to 95% of the length of irradiation spot S in the second direction. That is, in this aspect, a region where attenuation part 131 is not formed is provided at the outer edge of irradiation spot S in both the first direction and the second direction.

Here, the relationships of the positions and the sizes of attenuation part 131 and irradiation spot S with irradiation spot S at the end surface of optical transmission member 140 are described. In the present embodiment, in order to appropriately perform attenuation while maintaining the outer shape of irradiation spot S, attenuation part 131 includes a plurality of reflecting surfaces 132, a plurality of transmission surfaces 133, and a plurality of connection surfaces 134. However, in the case where irradiation spot S is disposed inside attenuation part 131, interference of the light occurs, and the light may be split at the end surface of optical transmission member 140. In view of this, in the present embodiment, attenuation part 131 is shorter than irradiation spot S at third optical surface 123 of the light entered from first optical surface 121 in at least one direction.

Figure 6A:
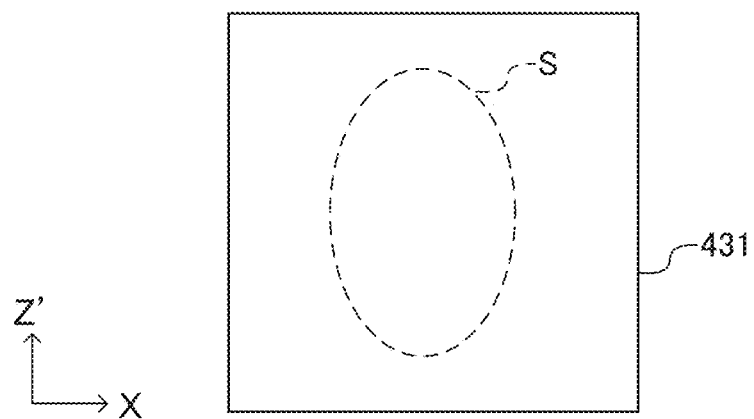
FIG. 6A illustrates relationships of positions and sizes of an attenuation part and a light irradiation spot in Comparative Example.
Figure 6B:
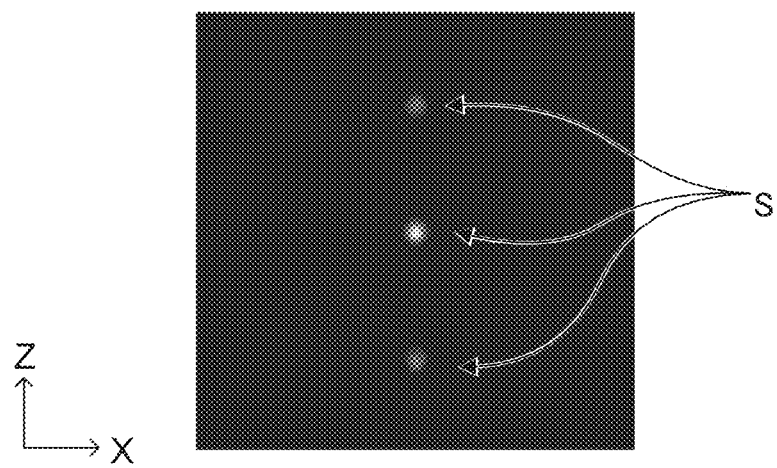
FIG. 6B shows a simulation result of a light irradiation spot at an end surface of an optical transmission member.

First, relationships of the positions and the sizes of attenuation part 431 and irradiation spot S with irradiation spot S at the end surface of optical transmission member 140 in Comparative Example are described. FIG. 6A is a schematic view illustrating a relationship of the positions and the sizes of attenuation part 131 and irradiation spot S in Comparative Example. FIG. 6B shows a simulation result of irradiation spot S at the end surface of optical transmission member 140.

As illustrated in FIG. 6A, attenuation part 431 of Comparative Example is larger than irradiation spot S at third optical surface 123. In the case where attenuation part 431 is larger than irradiation spot S at third optical surface 123 in this manner, it can be seen that irradiation spot S is split in the first direction (the Z' direction), as illustrated in FIG. 6B. A possible reason for this is that irradiation spot S is split by interference of light reflected at a plurality of minute third optical surfaces 123. In addition, irradiation spot S at the center portion is spread in the first direction (the Z direction) and the second direction (the X direction).

Figure 7A:
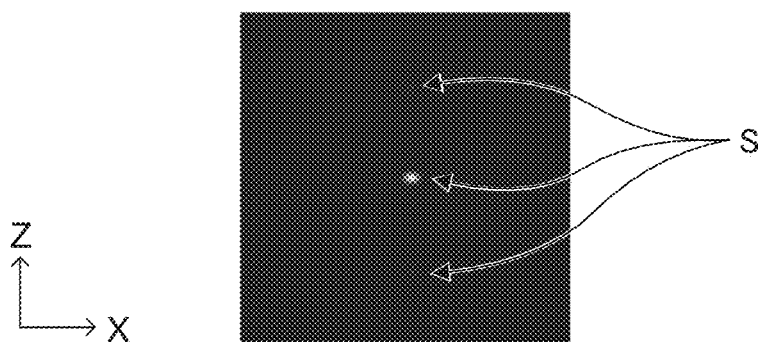
FIGS. 7A to 7C illustrate a simulation result of a light irradiation spot at an end surface of an optical transmission member of the embodiment.
Figure 7B:
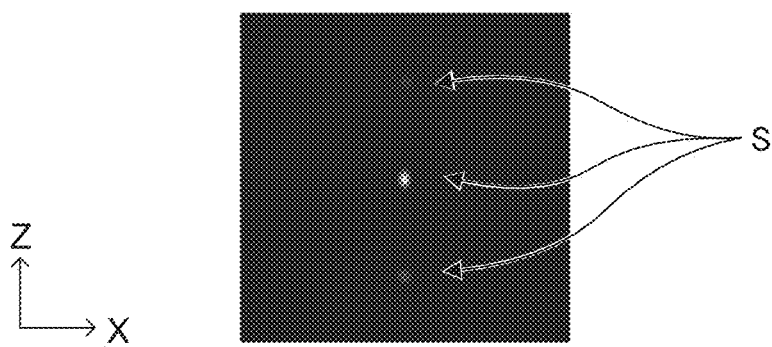
Figure 7C:
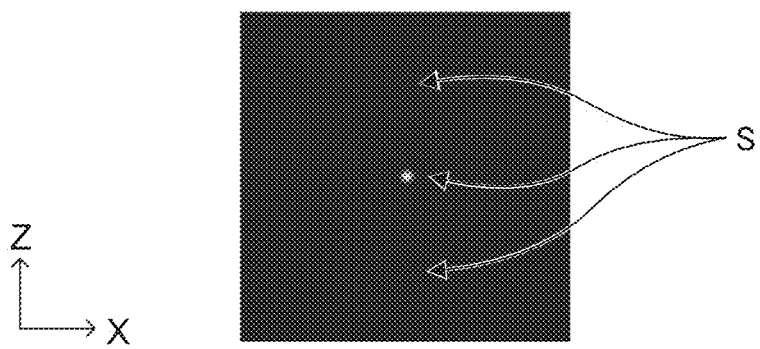

FIG. 7A shows a simulation result of irradiation spot S at the end surface of optical transmission member 140 in the case where optical receptacle 120 including attenuation part 131 illustrated in FIG. 5A is used. FIG. 7B shows a simulation result of irradiation spot S at the end surface of optical transmission member 140 in the case where optical receptacle 120 including attenuation part 131 illustrated in FIG. 5B is used. FIG. 7C shows a simulation result of irradiation spot S at the end surface of optical transmission member 140 in the case where optical receptacle 120 including attenuation part 131 illustrated in FIG. 5C is used.

As illustrated in FIGS. 5A and 7A, in the case where attenuation part 131 is shorter than irradiation spot S in the first direction, irradiation spot S at the end surface was slightly split in the first direction (the Z' direction), but the degree of the split was significantly reduced than that of Comparative Example. In addition, the expansion of irradiation spot S in the Z direction at the center portion was smaller than that of the Comparative Example.

As illustrated in FIGS. 5B and 7B, in the case where attenuation part 131 is shorter than irradiation spot S in the second direction (the X direction), irradiation spot S at the end surface was slightly split, but the degree of the split was significantly reduced than that of Comparative Example. In addition, the expansion of irradiation spot S at the center portion in the second direction (the X direction) was smaller than that of the Comparative Example.

In addition, it was confirmed that in the case where attenuation part 131 is shorter than irradiation spot S in the first direction (the Z' direction) (see FIG. 7A), the split of irradiation spot S in the Z direction can be further suppressed than the case where attenuation part 131 is shorter than irradiation spot S in the second direction (the X direction) (see FIG. 7B).

As illustrated in FIGS. 5C and 7C, in the case where attenuation part 131 is shorter than irradiation spot S in both the first direction (the Z' direction) and the second direction (the X direction), almost no split of irradiation spot S at the end surface occurred. In addition, the expansion of irradiation spot S in the Z direction and the second direction (the X direction) at the center portion was smaller than that of the Comparative Example.

It was confirmed from these results that the split of irradiation spot S at the end surface of optical transmission member 140 due to diffraction at attenuation part 131 can be suppressed when attenuation part 131 is shorter than irradiation spot S in at least one of the first direction (the Z' direction) and the second direction (the X direction).

Light Path in Optical Module

Figure 8A:
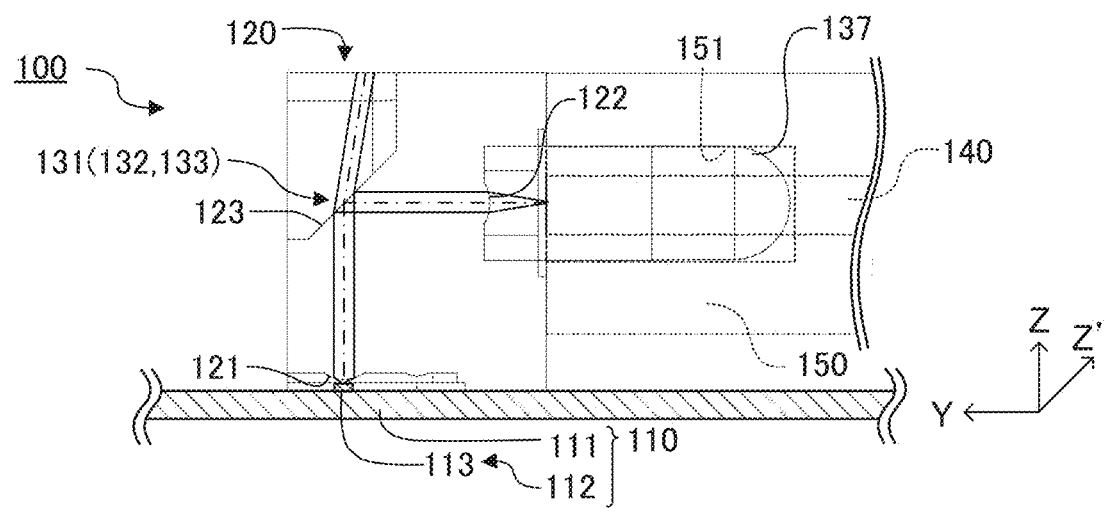
FIGS. 8A to 8C illustrate light paths of an optical module according to Embodiment 1 of the present invention.
Figure 8B:
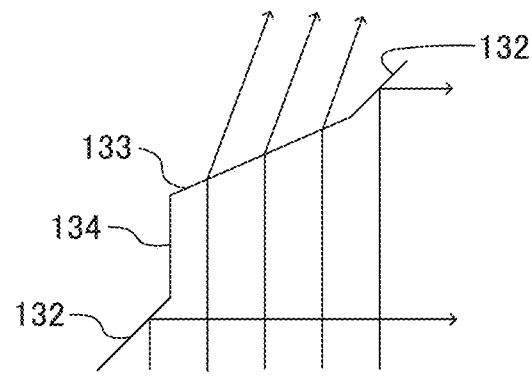
Figure 8C:
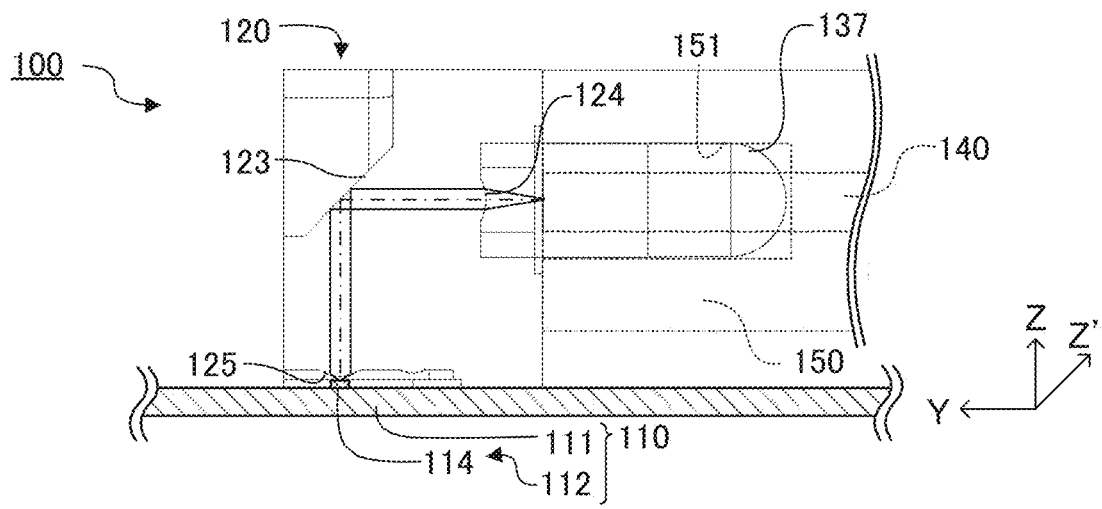

Light paths in optical module 100 according to the present embodiment are described below. FIG. 8A illustrates light paths of a transmission portion of optical module 100, FIG. 8B is a partially enlarged cross section illustrating light paths of attenuation part 131, and FIG. 8C illustrates light paths in a reception portion of optical module 100. Note that in FIGS. 8A to 8C, hatching is omitted to illustrate light paths.

As illustrated in FIGS. 8A and 8B, in the transmission portion of optical module 100, light emitted from light-emitting element 113 enters optical receptacle 120 from first optical surface 121. The light entered from first optical surface 121 advances toward third optical surface 123 and reaches third optical surface 123. Since third optical surface 123 includes attenuation part 131 including reflecting surface 132, transmission surface 133 and connection surface 134, a part of the light having reached third optical surface 123 is reflected at third optical surface 123 around reflecting surface 132 and attenuation part 131 toward second optical surface 122, and another part of the light is transmitted through transmission surface 133. At this time, a part of the light having reached third optical surface 123 is transmitted through it, and thus the light travelling toward second optical surface 122 is attenuated.

Light reflected by third optical surface 123 (reflecting surface 132) reaches second optical surface 122. The light having reached second optical surface 122 is emitted from second optical surface 122 toward the end surface of optical transmission member 140. At this time, with attenuation part 131 smaller than irradiation spot S at third optical surface 123, the influence of the diffraction at attenuation part 131 is reduced, and the split of irradiation spot S at the end surface of optical transmission member 140 is suppressed.

As illustrated in FIG. 8C, in a reception portion of optical module 100, light emitted from optical transmission member 140 enters optical receptacle 120 from fourth optical surface 124. The light having entered optical receptacle 120 advances toward third optical surface 123 and reaches third optical surface 123. The light having reached third optical surface 123 reflected at third optical surface 123 around reflecting surface 132 and attenuation part 131 toward fifth optical surface 125. The light having reached fifth optical surface 125 is emitted toward light-receiving element 114.

Modification

Next, an optical module according to a modification of the present embodiment is described. Note that the optical module according to the modification of the present embodiment is different from optical module 100 of Embodiment 1 only in configurations of attenuation parts 231 and 331, and therefore only the structures of attenuation parts 231 and 331 are described below.

Figure 9A:
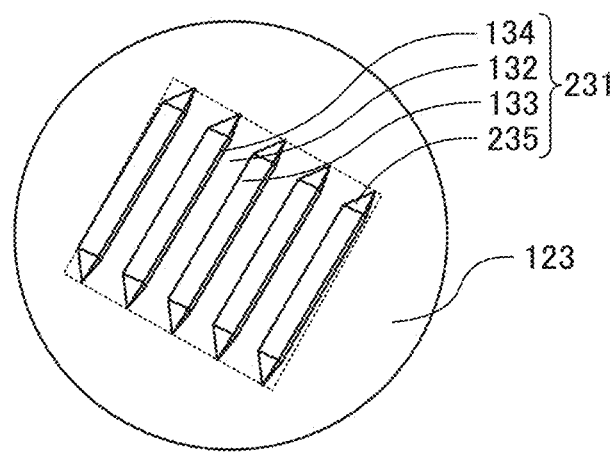
FIGS. 9A and 9B are perspective views of an attenuation part of a modification according to Embodiment 1 of the present invention.
Figure 9B:
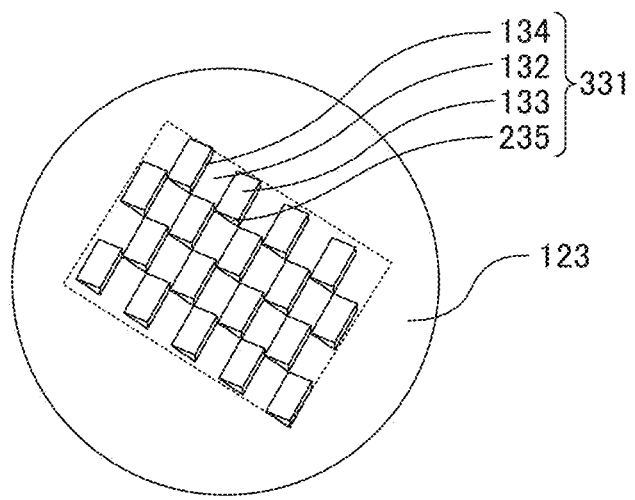

FIG. 9A is a schematic view illustrating a configuration of attenuation part 231 of Modification 1, and FIG. 9B is a perspective view illustrating a configuration of attenuation part 331 of Modification 2.

As illustrated in FIG. 9A, attenuation part 231 of Modification 1 includes a plurality of reflecting surfaces 132, a plurality of transmission surfaces 133, a plurality of connection surfaces 134, and a plurality of side surfaces 235. In the present modification, side surface 235 is tilted with respect to third optical surface 123. In addition, also in the present modification, attenuation part 231 is shorter than irradiation spot S at third optical surface 123 in at least one direction.

As illustrated in FIG. 9B, attenuation part 331 of Modification 2 includes a plurality of reflecting surfaces 132, a plurality of transmission surfaces 133, a plurality of connection surfaces 134, and a plurality of side surfaces 235. Attenuation part 331 is alternately disposed in the first direction (the Z' direction) and the second direction (the X direction) into a matrix. In addition, even in the case where side surface 135 may be tilted with respect to third optical surface 123. In addition, also in the present modification, attenuation part 331 is shorter than irradiation spot S at third optical surface 123 in at least one direction.

Effect

As described above, in optical receptacle 120 according to the present embodiment, attenuation parts 131, 231 and 331 are shorter than irradiation spot S at third optical surface 123 in at least one direction, and thus the influence of the diffraction at attenuation part 131 is reduced, and the split of irradiation spot S at the end surface of optical transmission member 140 is suppressed w % bile maintaining the outer shape of irradiation spot S.

Note that while optical module 100 for transmission and reception is described in the present embodiment, the optical module according to the embodiment of the present invention may be an optical module for transmission. In this case, the optical receptacle does not include fourth optical surface 124 and fifth optical surface 125.

Embodiment 2

Configuration of Optical Module

Optical module 100 according to Embodiment 2 is configured to detect detection light for detecting whether light is appropriately emitted from light-emitting element 113. Optical module 100 according to the present embodiment is different from optical module 100 according to Embodiment 1 in the configuration of optical receptacle 120. In view of this, features are described below and the same configurations as those of optical module 100 according to Embodiment 1 are denoted with the same reference numerals and description thereof is omitted.

Figure 10A:
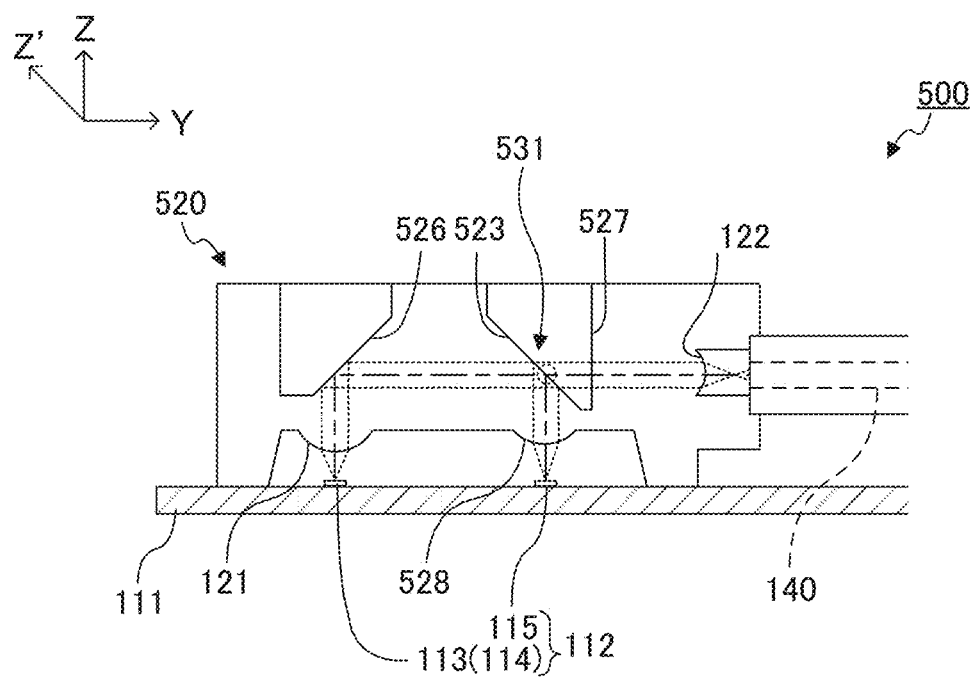
FIGS. 10A and 10B illustrate a configuration of an optical module according to Embodiment 2 of the present invention.
Figure 10B:
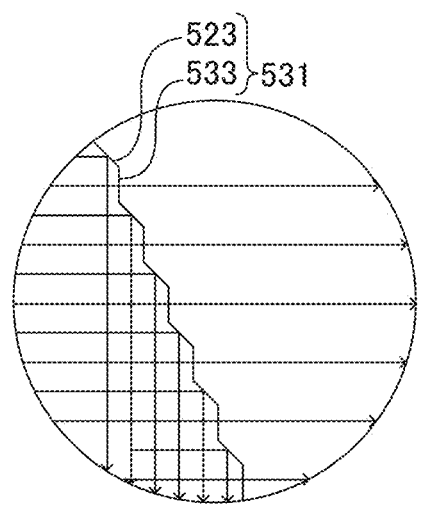

FIG. 10A is a sectional view of optical module 500 according to Embodiment 2 of the present invention, and FIG. 10B is a partially enlarged view of the region illustrated with the broken line in FIG. 10A. Note that in FIGS. 10A and 10B, the hatching is omitted to illustrate the light paths.

As illustrated in FIG. 10, optical module 100 according to Embodiment 2 includes photoelectric conversion apparatus 110 and optical receptacle 120.

Photoelectric conversion apparatus 110 according to the present embodiment includes substrate 111 and photoelectric conversion element 112. In the present embodiment, optical module 100 is configured for transmission and reception and configured to confirm whether light-emitting element 113 is appropriately emitting light, and therefore, photoelectric conversion element 112 is light-emitting element 113, detection device 115 and light-receiving element 114. Detection device 115 is, for example, a photodetector. The number of detection devices 115 is the same as the number of light-emitting elements 113. In the present embodiment, four light-emitting elements 113 are disposed, and accordingly four detection devices 115 are provided. In addition, four detection devices 115 are disposed in parallel with the arrangement direction of four light-emitting elements 113. In addition, detection devices 115 are arranged on the same straight line.

Configuration of Optical Receptacle

Optical receptacle 520 includes first optical surface 121, second optical surface 122, third optical surface 523, sixth optical surface 526, seventh optical surface 527, and eighth optical surface 528. The material of optical receptacle 520 of the present embodiment is the same as the material of optical receptacle 120 of Embodiment 1. In addition, first optical surface 121 and second optical surface 122 are the same as first optical surface 121 and second optical surface 122 of Embodiment 1, and therefore the description thereof will be omitted.

Sixth optical surface 526 is a reflecting surface that reflects, toward third optical surface 523, light entered from first optical surface 121. Sixth optical surface 526 is tilted toward optical transmission member 140 (third optical surface 523) in the direction from the bottom surface toward the top surface of optical receptacle 120. In the present embodiment, the inclination angle of sixth optical surface 526 is 45° with respect to installation surface 116 (the optical axis of the light incident on sixth optical surface 526).

Third optical surface 523 transmits, toward second optical surface 122, a part of the light entered from first optical surface 121 and reflected by sixth optical surface 526, and reflects, toward eighth optical surface 528, another part of the light entered from first optical surface 121. Third optical surface 223 is tilted toward sixth optical surface 526 in the direction from the bottom surface toward the top surface of optical receptacle 120. In the present embodiment, the inclination angle of third optical surface 223 is 450 with respect to installation surface 116 (the optical axis of the light incident on third optical surface 223).

Third optical surface 223 includes attenuation part 531. Attenuation part 531 of the present embodiment transmits, toward second optical surface 122, a part of the light reflected by sixth optical surface 526, and reflects, toward eighth optical surface 528, another part of the light reflected by sixth optical surface 526. Attenuation part 531 of the present embodiment is shorter than irradiation spot S at third optical surface 123 of the light entered from first optical surface 121 in at least one direction. Attenuation part 531 of the present embodiment includes reflecting surface 532, transmission surface 533, and a side surface (omitted in the drawing).

When the optical axis of the light that transmits through attenuation part 531 is set as the first optical axis and the optical axis of the light that is reflected by attenuation part 531 is set as the second optical axis, reflecting surface 532 and transmission surface 333 are alternately disposed in the first direction along an intersection line of third optical surface 523 and the plane including the first optical axis and the second optical axis, and are extended along the second direction orthogonal to the intersection line in third optical surface 523. That is, reflecting surface 532 and transmission surface 533 are repeatedly disposed in the named order in the inclination direction of third optical surface 523.

Reflecting surface 532 is a reflecting surface for reflecting, toward eighth optical surface 528, a part of the light reflected by sixth optical surface 526. Reflecting surface 532 may be a flat surface or a curved surface. In the present embodiment, reflecting surface 132 is a flat surface. Reflecting surface 532 is tilted toward sixth optical surface 526 in the direction from the bottom surface toward the top surface of optical receptacle 120. In the present embodiment, the inclination angle of reflecting surface 532 is 45° with respect to the installation surface (the optical axis of the light incident on reflecting surface 132).

Transmission surface 533 is a transmission surface for transmitting, toward second optical surface 122, another part of the light reflected by sixth optical surface 526. Transmission surface 533 may be a flat surface or a curved surface. In the present embodiment, transmission surface 533 is a flat surface. In addition, in the present embodiment, it is disposed along the direction perpendicular to installation surface 116.

The area ratio between reflecting surface 532 and transmission surface 533 is appropriately set in accordance with the quantity of the monitor light. To be more specific, the light quantity ratio of the light that is reflected by reflecting surface 532 and the light that is transmitted through transmission surface 533 is adjusted by adjusting the area ratio of reflecting surface 532 and transmission surface 533 as viewed from first optical surface 121 side.

Seventh optical surface 527 is an optical surface for reentering, into optical receptacle 520, at least a part of the light transmitted (emitted) through transmission surface 533 of attenuation part 531. The shape of seventh optical surface 527 is not limited as long as the above-mentioned function can be ensured. In the present embodiment, seventh optical surface 527 has a shape of a flat surface.

Eighth optical surface 528 is an optical surface for emitting, toward light detection device 115, the light reflected at third optical surface 223 around reflecting surface 532 and attenuation part 531 and advanced inside optical receptacle 520. Eighth optical surface 528 is formed in the surface (bottom surface) of optical receptacle 520 that faces substrate 111 so as to be able to face each detection device 115. The number of eighth optical surfaces 528 is not limited. In the present embodiment, four eighth optical surfaces 528 are provided. Eighth optical surfaces 528 are disposed along the same direction as the direction in which first optical surfaces 121 are disposed. The shape of eighth optical surface 528 is not limited. In the present embodiment, the shape of eighth optical surface 528 is a shape of a convex lens surface protruding toward detection device 115. In addition, eighth optical surface 528 has a circular shape in plan view. The central axis of eighth optical surface 528 may be or may not be perpendicular to the light reception surface of detection device 115. In the present embodiment, the central axis of eighth optical surface 528 is perpendicular to the light reception surface of detection device 115. In addition, the central axis of eighth optical surface 528 may be or may not be aligned with the central axis of the light reception surface of detection device 115. In the present embodiment, the central axis of eighth optical surface 528 is aligned with the central axis of the light reception surface of detection device 115.

Light Path in Optical Module

Here, light paths in optical module 100 according to the present embodiment are described below.

As illustrated in FIGS. 10A and 10B, light emitted from light-emitting element 113 enters optical receptacle 120 from first optical surface 121. Light entered from first optical surface 121 advances toward sixth optical surface 526 and reaches sixth optical surface 526. The light having reached sixth optical surface 526 is internally reflected toward third optical surface 523. A part of the light having reached third optical surface 523 is internally reflected at third optical surface 523 around reflecting surface 532 and attenuation part 531 toward eighth optical surface 528, and another part of the light is transmitted through transmission surface 533.

The light transmitted (emitted) through third optical surface 523 (transmission surface 133) advances toward seventh optical surface 527. At least a part of the light having reached seventh optical surface 527 reenters optical receptacle 520. The light having entered optical receptacle 520 from seventh optical surface 527 advances toward second optical surface 122. The light having reached second optical surface 122 is emitted from second optical surface 122 toward the end surface of optical transmission member 140. At this time, attenuation part 531 is shorter than irradiation spot S at third optical surface 123 in at least one direction, and thus the influence of the diffraction at attenuation part 531 is reduced, and the split of irradiation spot S at the end surface of optical transmission member 140 can be suppressed.

On the other hand, the light reflected by third optical surface 123 (reflecting surface 532) reaches eighth optical surface 528. The light having reached eighth optical surface 528 is emitted from eighth optical surface 528 toward the detection surface of detection device 115.

Effect

Thus, optical module 500 according to the present embodiment can detect whether light is appropriately emitted from light-emitting element 113 while achieving the effects of optical module 100 according to Embodiment 1.

INDUSTRIAL APPLICABILITY

The optical receptacle and the optical module according to the embodiments of the present invention are suitable for optical communications using optical transmission members.

REFERENCE SIGNS LIST 100, 500 Optical module
110 Photoelectric conversion apparatus
111 Substrate
112 Photoelectric conversion element
113 Light-emitting element
114 Light-receiving element
115 Detection device
120, 520 Optical receptacle
121 First optical surface
122 Second optical surface
123, 223, 523 Third optical surface
124 Fourth optical surface
125 Fifth optical surface
131, 231, 331, 431, 531 Attenuation part
132, 532 Reflecting surface
133, 533 Transmission surface
134 Connection surface
135, 235 Side surface
137 Ferrule protrusion
140 Optical transmission member
150 Ferrule
151 Ferrule recess
160 Installation surface
526 Sixth optical surface
527 Seventh optical surface
528 Eighth optical surface
S Irradiation spot

The invention claimed is:

1. An optical receptacle configured to optically couple a light-emitting element and an optical transmission member when the optical receptacle is disposed between the light-emitting element and the optical transmission member, the optical receptacle comprising:
a first optical surface configured to allow incidence of light emitted from the light-emitting element;
a second optical surface configured to emit, toward the optical transmission member, light entered from the first optical surface and advanced inside the optical receptacle; and
a third optical surface disposed on a light path between the first optical surface and the second optical surface, the third optical surface including an attenuation part configured to transmit a part of light entered from the first optical surface and reflect another part of the light entered from the first optical surface,
wherein the attenuation part includes a plurality of reflecting surfaces configured to reflect a part of the light entered from the first optical surface and a plurality of transmission surfaces configured to transmit another part of the light entered from the first optical surface,
wherein the plurality of reflecting surfaces and the plurality of transmission surfaces are alternately disposed in a first direction along an intersection line of the third optical surface and a plane including a first optical axis and a second optical axis, the first optical axis being an optical axis of light transmitted through the attenuation part, the second optical axis being an optical axis of light reflected by the attenuation part,
wherein the plurality of reflecting surfaces and the plurality of transmission surfaces are arranged at substantially equal pitches in the first direction, respectively, and
wherein in the third optical surface, the attenuation part is shorter than an irradiation spot at the third optical surface of the light entered from the first optical surface, in at least one direction.

2. The optical receptacle according to claim 1, wherein the attenuation part is shorter than the irradiation spot in the first direction.

3. The optical receptacle according to claim 2, wherein a length of the attenuation part in the first direction is 40% to 95% of a length of the irradiation spot in the first direction.

4. The optical receptacle according to claim 1, wherein the attenuation part is shorter than the irradiation spot in a second direction orthogonal to the intersection line in the third optical surface.

5. The optical receptacle according to claim 4, wherein a length of the attenuation part in the second direction is 40% to 95% of a length of the irradiation spot in the second direction.

6. The optical receptacle according to claim 1, wherein the attenuation part reflects, toward the second optical surface, a part of the light entered from the first optical surface.

7. The optical receptacle according to claim 1, wherein the attenuation part transmits, toward the second optical surface, a part of the light entered from the first optical surface.

8. An optical module, comprising:
a light-emitting element; and
the optical receptacle according to claim 1 configured to optically couple, to optical transmission member, the light emitted from the light-emitting element.

* * * * *